United States Patent [19]

Chung

[11] Patent Number: 5,328,624
[45] Date of Patent: Jul. 12, 1994

[54] STABILIZED GRAFTED ETHYLENE COPOLYMER ADDITIVE USEFUL IN OIL COMPOSITIONS

[75] Inventor: David Y. Chung, Edison, N.J.

[73] Assignee: Exxon Chemical Patents Inc., Linden, N.J.

[21] Appl. No.: 114,124

[22] Filed: Aug. 30, 1993

Related U.S. Application Data

[63] Continuation of Ser. No. 954,420, Sep. 30, 1992, abandoned, which is a continuation of Ser. No. 546,068, Jun. 29, 1990, abandoned, which is a continuation of Ser. No. 288,625, Dec. 22, 1988, abandoned, which is a continuation of Ser. No. 63,148, Jun. 16, 1987, abandoned.

[51] Int. Cl.$^5$ ............... C10M 133/58; C10M 133/56; C08F 267/04; C08F 265/02
[52] U.S. Cl. .................. 252/51.5 A; 525/285; 525/301
[58] Field of Search .................. 252/51.5 A; 525/285, 525/301

[56] References Cited

U.S. PATENT DOCUMENTS

| | | | |
|---|---|---|---|
| 4,089,794 | 6/1978 | Engel et al. | 252/51.5 |
| 4,137,185 | 1/1979 | Gardiner et al. | 252/33 |
| 4,144,181 | 3/1979 | Elliott et al. | 252/33 |
| 4,375,973 | 3/1983 | Rossi et al. | 44/62 |
| 4,517,104 | 5/1985 | Black et al. | 252/51.5 A |
| 4,632,769 | 12/1986 | Gutierrez et al. | 252/48.6 |
| 4,637,886 | 1/1987 | Brois et al. | 252/51.5 |
| 4,670,173 | 6/1987 | Hayashi et al. | 252/51.5 A |
| 4,686,054 | 8/1987 | Wisotsky et al. | 252/32.7 |
| 4,735,736 | 4/1988 | Chung | 252/51.5 A |
| 4,803,003 | 2/1989 | Chung | 252/51.5 |

FOREIGN PATENT DOCUMENTS 0072645  1/1987  European Pat. Off. .

Primary Examiner—Jerry D. Johnson
Attorney, Agent, or Firm—T. V. Kowalchyn

[57] ABSTRACT

Oil-soluble, derivatized ethylene copolymers derived from about 15 to 90 wt. % ethylene, and one or more $C_3$ to $C_{28}$ alpha-olefins, e.g. propylene, which are grafted, preferably solution-grafted under an inert atmosphere and at elevated temperatures and in the presence of a high-temperature decomposable free-radical initiator, with an ethylenically-unsaturated dicarboxylic acid material and thereafter reacted with a polyamine having at least two primary amine groups, e.g. an alkylene polyamine such as diethylene triamine, to form carboxyl-grafted polymeric imide, usually maleimide, derivatives are subsequently reacted with a $C_{12}$ to about $C_{18}$ hydrocarbyl substituted dicarboxylic acid anhydride, preferably a $C_{12}$ to about $C_{18}$ hydrocarbyl substituted succinic anhydride, to yield an oil-soluble stable imide of said carboxyl-grafted copolymeric imide whereby oil solutions thereof are characterized by minimal viscosity change over an extended period of time. Useful number average molecular weights ($M_n$) of said copolymers range from about 700 to 500,000; however, if the molecular weight is from about 10,000 to 500,000 then these copolymers are also useful as multi-functional viscosity index improvers.

22 Claims, No Drawings

STABILIZED GRAFTED ETHYLENE COPOLYMER ADDITIVE USEFUL IN OIL COMPOSITIONS

This is a continuation of application Ser. No. 954,420, filed Sep. 30, 1992, now abandoned which is a continuation of U.S. Ser. No. 546,068, now abandoned, filed Jun. 29, 1990, now abandoned which is a continuation of U.S. Ser. No. 288,625, filed Dec. 22, 1988, abandoned, which is a continuation of U.S. Ser. No. 063,148, filed Jun. 16, 1987, abandoned.

BACKGROUND OF THE INVENTION

1. Field of the Invention

This invention relates to polymeric dispersant additives for lubricating oils which may also be useful as viscosity index improvers exhibiting improved viscosity stability in oil upon storage. More particularly, this invention relates to copolymers of ethylene with one or more $C_3$ to $C_{28}$ alpha-olefins, preferably propylene, which have been grafted with ethylenically unsaturated acid moieties, e.g., maleic anhydride, and reacted with a polyamine to form multi-functional copolymeric reaction products, and said reaction products are then reacted with a viscosity stabilizing effective amount of a $C_{12}$ to about $C_{18}$ hydrocarbyl substituted dicarboxylic acid anhydride to inhibit or retard viscosity increase over an extended period of time of oil solutions of these additives.

2. Description of the Prior Art

Viscosity index (V.I.) improving high molecular weight ethylene copolymers derivatized with acid moieties such as maleic anhydride and amines to form a V.I. improver-dispersant oil additives are well known in the art. Thus, for example, U.S. Pat. Nos. 3,316,177 and 3,326,804 teach the general concept of grafting an ethylene-propylene copolymer with maleic anhydride and then reacting with a polyalkylene polyamine such as polyethylene amine. Subsequently, U.S. Pat. No. 4,089,794 was directed to using an oil solution for free radical peroxide grafting the ethylene copolymer with maleic anhydride and then reacting with the polyamine. This concept has the advantage that by using oil the entire reaction would be carried out in an oil solution to form an oil concentrate, which is the commercial form in which such additives are sold.

It is often found that during storage of oil solutions, particularly oil concentrates, of these various grafted ethylene copolymers the viscosity of the oil solution is increased. The source of this increase appears to be, at least in part, the chain extension of the polymer. Several solutions to this problem are described in the prior art. One solution is to use the polyamines and then to react the remaining unreacted primary amino groups with acid anhydrides of either $C_1$–$C_{30}$ monocarboxylic acid, preferably acetic anhydride, or unsubstituted or $C_1$ to $C_8$ hydrocarbyl substituted dicarboxylic acid anhydrides of U.S. Pat. No. 4,137,185; or the sulfonic acids of U.S. Pat. No. 4,144,181. These materials act as polyamine group end-capping or inactivating agents to inhibit or limit chain extension. That is to say, the reaction product of the graft copolymer of the ethylenically unsaturated dicarboxylic acid material and polyamine is post-treated with these acid materials to inhibit chain extension and viscosity increase of the imide grafted ethylene copolymer.

While the end-capped or chain extension terminated grafted ethylene copolymers disclosed in U.S. Pat. Nos. 4,137,185 and 4,144,181 are generally quite useful, they possess some problems under certain conditions. Thus, for example, reacting a monocarboxylic acid anhydride, e.g., acetic anhydride, with the polyamine yields an acid by-product, e.g., acetic acid. This acid is deleterious to engine operation, causing corrosion, and generally needs to be removed from the oil solution of the V.I. improver-dispersant.

Furthermore, the use of the unsubstituted or lower hydrocarbyl substituted dicarboxylic acid anhydrides of U.S. Pat. No. 4,137,185 generally does not remedy, and may sometimes even contribute to, the formation of haze in oil solutions of the imide grafted ethylene copolymer. This is due to the fact that when using free radical initiators with mineral oil as the grafting medium a proportion of the oil molecules in turn become grafted with the ethylenically unsaturated moiety, e.g., maleic anhydride, and upon subsequent reaction with the amine these grafted oil particles tend to become insoluble and to form haze. Upon the addition of the hydrocarbyl substituted dicarboxylic acid anhydrides to this oil solution to inactivate the unreacted primary amine groups of the imide grafted ethylene copolymer, a certain proportion of the anhydride reacts with the free amine groups of the grafted oil particles. Since the prior are anhydrides are either unsubstituted or lower hydrocarbyl substituted they do not facilitate the solubilization of these insoluble grafted oil particles. However, since the dicarboxylic acid anhydrides of the instant invention are substituted with a $C_{12}$ to about $C_{18}$ hydrocarbyl group they tend to facilitate the solubilization of the insoluble grafted oil particles, thereby decreasing haze.

The use of the sulfonic acids of U.S. Pat. No. 4,144,181 may also result in the formation of undesirable acid by-products, e.g., hydrogen sulfide.

It has been found that improved viscosity stability upon storage of oil solutions, particularly oil concentrates, of the imide grafted ethylene copolymers can be achieved while remedying the problems of acid by-product formation and hazing accompanying the utilization of these prior art polyamine group end-capping or chain extension terminating agents by utilizing a $C_{12}$ to $C_{18}$ hydrocarbyl substituted dicarboxylic acid anhydride as the polyamine end-capping or chain extension terminating agent.

The prior art, i.e., U.S. Pat. Nos. 4,517,104 and 4,632,769, also teaches the use of certain carboxylic alkenyls during the imidation of the ethylenically unsaturated carboxylic acid grafted ethylene copolymer. However, these carboxylic alkenyls are used for a different purpose, serve a different function, and result in a different end product than that of the present invention. These patents disclose grafting ethylene copolymers with ethylenically unsaturated carboxylic acid moieties, preferably maleic anhydride moieties, and then reacting the grafted copolymer with a mixture containing polyamines having two or more primary amine groups and a carboxylic alkenyl component, preferably alkylene polyamine and alkenyl succinic anhydride; or the grafted ethylene copolymer can be reacted with the already formed salts, amides, imides, etc. of said polyamine and carboxylic alkenyl component, preferably imides of alkylene polyamine and alkenyl succinic anhydride. Thus, the carboxylic alkenyl component is one of the reactants and enters into in the imidation reaction involving the polyamine and the ethylenically unsaturated acid grafted ethylene copolymer.

U.S. Pat. No. 4,517,104 discloses that the carboxylic alkenyl component can be, inter alia, a $C_{12}$ to $C_{49}$, preferably $C_{16}$ to $C_{49}$ hydrocarbyl succinic anhydride or acid. U.S. Pat. No. 4,632,769 discloses that the carboxylic alkenyl component can be, inter alia, a $C_{22}$ to $C_{28}$ hydrocarbyl substituted succinic anhydride. However, these patents teach that the carboxylic alkenyl component and the polyamine are reacted simultaneously with the grafted ethylene copolymer or that the grafted ethylene copolymer is reacted with the prefomed salts, amides, imides, etc. of said polyamines and carboxylic alkenyl component.

This is in sharp contrast to the practice of the instant invention wherein the preformed imide grafted ethylene copolymer is reacted with the $C_{12}$ to about $C_{18}$ hydrocarbyl substituted dicarboxylic acid anhydride. The main purpose of reacting either the preformed salts, amides, imides, etc. of the polyamine and the carboxylic alkenyl component or a mixture of the polyamine and carboxylic alkenyl component with the ethylenically unsaturated acid grafted ethylene copolymer is to have the carboxylic alkenyl moiety enter into the imidation and/or amidation reaction thereby preventing excessive cross-linking via the unreacted primary amine groups of the polyamine thereby controlling the molecular weight of the grafted ethylene copolymer product. Generally, the greater the amount of the carboxylic alkenyl component present during the imidation and/or amidation reaction of the ethylenically unsaturated acid grafted ethylene copolymer and the polyamine the lower the degree of cross-linking and the lower the molecular weight of the final grafted ethylene copolymer. The smaller the amount of said carboxylic alkenyl component present during the imidation and/or amidation reaction, the greater the degree of cross-linking and the higher the molecular weight of the grafted ethylene copolymer product.

While not wishing to be bound by any theory this is believed to be due to stoichiometric considerations of the imidation and/or amidation process used to form these grafted ethylene copolymers. There is generally a competing reaction between the polyamines and the acid moiety of the ethylenically unsaturated acid grafted ethylene copolymer on the one hand and the carboxylic alkenyl component on the other hand. Using less of the carboxylic alkenyl component results in more of the polyamine being available to react, via the unreacted primary amine groups, with the acid moiety of the acid grafted ethylene copolymer. This results in an increased degree of cross-linking and an increased molecular weight. If, on the other hand, more of the carboxylic alkenyl component is utilized the amount of the polyamine containing at least one unreacted primary amino group, available to react with the acid moiety of the acid grafted ethylene copolymer to form the imide grafted ethylene copolymer, is reduced thereby resulting in a lower degree of cross-linking and a lower molecular weight. Therefore, since the carboxylic alkenyl component functions as a cross-linking and molecular weight regulator and not as a viscosity stabilizing agent the viscosity of oil solutions, particularly oil concentrates, of these grafted ethylene copolymers also tends to increase with time.

SUMMARY OF THE INVENTION

The present invention is directed to oil soluble additives, particularly viscosity index improver-dispersant additives, for oleaginous materials and oil solutions thereof which exhibit improved viscosity stability upon storage. More particularly the present invention is directed to ethylene copolymers reacted or grafted with ethylenically unsaturated carboxylic acid moieties and then reacted with polyamines having two or more primary amines, and subsequently treated or reacted with a viscosity stabilizing, polyamine group end-capping or chain extention limiting effective amount of a $C_{12}$ to $C_{18}$ hydrocarbyl substituted dicarboxylic acid anhydride.

The present invention is also directed to a process for improving the viscosity stability of an oil solution, particularly an oil concentrate, comprising an oleaginous solvent and from 0.1 to 50 wt. %, based on the total weight of said concentrate, of an imide grafted ethylene/$C_3$-$C_{28}$ alpha-olefin copolymeric oil additive comprising the step of post-treating or post-reacting said solution with a viscosity stabilizing effective amount of a $C_{12}$ to about $C_{18}$ hydrocarbyl substituted dicarboxylic acid anhydride.

DETAILED DESCRIPTION OF THE INVENTION

It has been discovered that the post-treatment or reaction of (a) the reaction products of an ethylene copolymer grafted with ethylenically unsaturated carboxylic acid moieties, preferably maleic anhydride moieties, and then reacted with a polyamine containing at least two primary amine groups, with (b) a $C_{12}$ to about $C_{18}$ hydrocarbyl substituted dicarboxylic acid anhydride, preferably hydrocarbyl substituted succinic anhydride, provides Viscosity stabilizing activity to oleaginous solutions, particularly concentrates, of said copolymers.

The reaction products of an ethylene copolymer grafted with ethylenically unsaturated carboxylic acid moieties and then reacted with a polyamine are disclosed in U.S. Pat. No. 4,137,185, incorporated herein by reference.

While not wishing to be bound by any theory it is believed that the viscosity stabilization involves the conversion of the residual unreacted primary amino groups of the reaction product of the ethylene copolymer grafted with ethylenically unsaturated carboxylic acid moieties and then reacted with a polyamine having two or more primary amines, to imide groups thereby limiting chain extension of the polyamine groups.

The reaction appears to involve imidation of the pendant unreacted primary amine groups by reaction with the $C_{12}$ to $C_{18}$ hydrocarbyl substituted dicarboxylic acid anhydride. This imidation of the unreacted primary amino groups with the anhydride of the instant invention produces an imide structure which limits the multi-functionalized copolymers propensity of solution chain extension thereby inhibiting viscosity increase of oil solutions containing the class of additives of the invention.

Ethylene Copolymer

Oil soluble ethylene copolymers used in the invention generally will have a number-average molecular weight ($\overline{M}_n$) of from about 700 to about 500,000; preferably 10,000 to 250,000 and optimally from about 20,000 to 100,000. In general, polymers having a $\overline{M}_n$ of 10,000 to 500,000 are also useful as V.I. improvers. These V.I. improvers will generally have a narrow range of molecular weight, as determined by the ratio of weight-average molecular weight ($\overline{M}_w$) to number-average molecular weight ($\overline{M}_n$). Polymers having a $\overline{M}_w/\overline{M}_n$) of less than 10, preferably less than 7, and more preferably 4 or less are most desirable. As used herein ($\overline{M}_n$) and ($\overline{M}_w$) are measured by the well known techniques of vapor phase osmometry (VPO), membrane osmometry and gel permeation chromotography. In general, polymers having a narrow range of molecular weight may be obtained by a choice of synthesis conditions such as choice of principal catalyst and cocatalyst combination, addition of hydrogen during the synthesis, etc. Post synthesis treatment such as extrusion at elevated temperature and under high shear through small orifices, mastication under elevated temperatures, thermal degradation, fractional precipitation from solution, etc. may also be used to obtain narrow ranges of desired molecular weights and to break down higher molecular weight polymer to different molecular weight grades for V.I. use.

These polymers are prepared from ethylene and ethylenically unsaturated hydrocarbons including cyclic, alicyclic and acyclic, containing from 3 to 28 carbons, e.g. 2 to 18 carbons. These ethylene copolymers may contain from 15 to 90 wt. % ethylene, preferably 30 to 80 wt. % of ethylene and 10 to 85 wt. %, preferably 20 to 70 wt. % of one or more $C_3$ to $C_{28}$, preferably $C_3$ to $C_{18}$, more preferably $C_3$ to $C_8$, alpha olefins. While not essential, such copolymers preferably have a degree of crystallinity of less than 25 wt. %, as determined by X-ray diffraction and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc., include 1-butene, 1-pentene, 1-hexene, 1-heptene, 1-octene, 1-nonene, 1-decene, etc.; also branched chain alpha-olefins, such as 4-methyl, 4-methyl-1-hexene, 5-methylpentene-1, 4,4-dimethyl-1-pentene, and 6-methylheptene-1, etc., and mixtures thereof.

The term copolymer as used herein, unless otherwise indicated, includes terpolymers, tetrapolymers, etc., of ethylene, said $C_{3-28}$ alpha-olefin and/or a non-conjugated diolefin or mixtures of such diolefins which may also be used. The amount of the non-conjugated diolefin will generally range from about 0.5 to 20 mole percent, preferably about 1 to about 7 mole percent, based on the total amount of ethylene and alpha-olefin present.

Representative examples of non-conjugated dienes that may be used as the third monomer in the terpolymer include:

a. Straight chain acyclic dienes such as: 1,4-hexadiene; 1,5-heptadiene; 1,6-octadiene.

b. Branched chain acyclic dishes such as: 5-methyl-1,4-hexadiene; 3,7-dimethyl-1,6-octadiene; 3,7-dimethyl-1,7-octadiene; and the mixed isomers of dihydromyrcene and dihydro-cymene.

c. Single ring alicyclic dienes such as: 1,4-cyclohexadiene; 1,5-cyclooctadiene; 1,5-cyclododecadiene; 4-vinylcyclohexene; 1-allyl, 4-isopropylidene cyclohexane; 3-allyl-cyclopentene; 4-allyl cyclohexene and 1-isopropenyl-4-(4-butenyl) cyclohexane.

d. Multi-single ring alicyclic dienes such as: 4,4'-dicyclopentenyl and 4,4'-dicyclohexenyl dienes.

e. Multi-ring alicyclic fused and bridged ring dienes such as: tetrahydroindene; methyl tetrahydroindene; dicyclopentadiene; bicyclo (2.2.1) hepta 2,5-diene; alkyl, alkenyl, alkylidene, cycloalkenyl and cycloalkylidene norbornenes such as: ethyl norbornene; 5-methylene-6-methyl-2-norbornene; 5-methylene-6, 6-dimethyl-2-norbornene; 5-propenyl-2-norbornene; 5-(3-cyclopentenyl)-2-norbornene and 5-cyclohexylidene-2-norbornene; norbornadiene; etc.

Ethylenically Unsaturated Carboxylic Acid Material

These materials which are grafted (attached) onto the ethylene copolymer contain at least one ethylenic bond and at least one, preferably two, carboxylic acid groups, or an anhydride group, or a polar group which is convertible into said carboxyl groups by oxidation or hydrolysis. Maleic anhydride or a derivative thereof is preferred as it does not appear to homopolymerize appreciably but grafts onto the ethylene copolymer to give two carboxylic acid functionalities. Such preferred materials have the generic formula

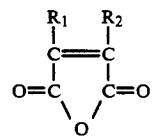

wherein $R_1$ and $R_2$ are hydrogen or a halogen. Suitable examples additionally include chloro-maleic anhydride, itaconic anhydride, or the corresponding dicarboxylic acids, such as maleic acid or fumaric acid or their monoesters, etc.

As taught by U.S. Pat. No. 4,160,739 and U.S. Pat. No. 4,161,452, various unsaturated comonomers may be grafted on the olefin copolymer together with the unsaturated acid component, e.g. maleic anhydride. Such graft copolymer systems may comprise one or a mixture of comonomers different from the unsaturated acid component and which contain only one copolymerizable double bond and are copolymerizable with said unsaturated acid component. Typically, such comonomers do not contain free carboxylic acid groups and are esters containing alpha-ethylenic unsaturation in the acid or alcohol portion; hydrocarbons, both aliphatic and aromatic, containing alpha-ethylenic unsaturation, such as the $C_4$–$C_{12}$ alpha olefins, for example hexane, nonene, dodecene, etc.; styrenes, for example styrene, alpha-methyl styrene, alpha-methyl styrene, p-secbutyl styrene, etc.; and vinyl monomers, for example vinyl acetate, vinyl chloride, vinyl ketones such as methyl and ethyl vinyl ketone, nitrogen containing vinyl monomers such as vinyl pyridine and vinyl pyrollidine, etc. Comonomers containing functional groups which may cause crosslinking, gelation or other interfering reactions should be avoided, although minor amounts of such comonomers (up to about 10% by weight of the comonomer system) often can be tolerated.

Specific useful copolymerizable comonomers include the following:

(A) Esters of saturated acids and unsaturated alcohols wherein the saturated acids may be monobasic or polybasic acids containing up to about 40 carbon atoms such as the following: acetic, propionic, burytic, valetic, caproic, stearic, oxalic, malonic, succinic, glutaric, adipic, pimelic, suberic, azelaic, sebacic, phthalic, isophthalic, terephthalic, hemimellitic, trimellitic, trimesic and the like, including mixtures. The unsaturated alcohols may be monohydroxy or polyhydroxy alcohols and may contain up to about 40 carbon atoms, such as the following: allyl, methallyl, crotyl, 1-chloroallyl, 2-chloroallyl, cinnamyl, vinyl, methyl vinyl, 1-phenallyl, butenyl, propargyl, 1-cyclohexene-3-ol, oleyl, and the like, including mixtures.

(B) Esters of unsaturated monocarboxylic acids containing up to about 12 carbon atoms such as acrylic, methacrylic and crotonic acid, and an esterifying agent containing up to about 50 carbon atoms, selected from saturated alcohols and alcohol epoxides. The saturated alcohols may preferably contain up to about 40 carbon atoms and include monohydroxy compounds such as: methanol, ethanol, propanol, butanol, 2-ethylhexanol, octanol, dodecanol, cyclohexanol, cyclopentanol, neopentyl alcohol, and benzyl alcohol; and alcohol ethers such as the monomethyl or monobutyl ethers of ethylene or propylene glycol, and the like, including mixtures. The alcohol epoxides include fatty alcohol epoxides, glycidol, and various derivatives of alkylene oxides, epichlorohydrin, and the like, including mixtures.

The components of the graft copolymerizable system are used in a ratio of unsaturated acid monomer component to comonomer component of about 1:4 to 4:1, preferably about 1:2 to 2:1 by weight.

Grafting of the Ethylene Copolymer

The grafting of the ethylene copolymer with the carboxylic acid material may be by any suitable method, such as thermally by the "ene" reaction, using copolymers containing unsaturation, such as ethylene-propylene-diene polymers either chlorinated or unchlorinated, or more preferably it is by free-radical induced grafting, either in bulk without solvent as in an extruder or masticator, or in solvent, preferably in a mineral lubricating oil as solvent.

The radical grafting is preferably carried out using free radical initiators such as peroxides, hydroperoxides, and azo compounds and preferably those which have a boiling point greater than about 100° C. and which decompose thermally within the grafting temperature range to provide said free radicals. Representative of these free-radical initiators are azobutyro-nitrile, 2,5-dimethylhex-3-yne-2, 5-bis-tertiary-butyl peroxide (sold as Lupersol 130) or its hexane analogue, di-tertiary butyl peroxide and dicumyl peroxide. The initiator is generally used at a level of between about 0.005% and about 1%, based on the total weight of the polymer solution, and at temperatures of about 150° to 220° C.

The ethylenically unsaturated carboxylic acid material, preferably maleic anhydride, will be generally used in an amount ranging from about 0.01% to about 10%, preferably 0.1 to 2.0%, based on weight of the initial total solution. The aforesaid carboxylic acid material and free radical initiator are generally used in a weight ratio range of about 1.0:1 to 30:1, preferably 3.0:1 to 6:1.

The initiator grafting is preferably carried out in an inert atmosphere, such as that obtained by nitrogen blanketing. While the grafting can be carried out in the presence of air, the yield of the desired graft polymer is generally thereby decreased as compared to grafting under an inert atmosphere substantially free of oxygen. The grafting time will usually range from about 0.1 to 12 hours, preferably from about 0.5 to 6 hours, more preferably 0.5 to 3 hours. The graft reaction will be usually carried out to at least approximately 4 times, preferably at least about 6 times the half-life of the free-radical initiator at the reaction temperature employed, e.g. with 2,5-dimethyl hex-3-yne-2, 5-bis(t-butyl peroxide) 2 hours at 160° C. and one hour at 170° C., etc.

In the grafting process, usually the copolymer solution is first heated to grafting temperature and thereafter said unsaturated carboxylic acid material and initiator are added with agitation, although they could have been added prior to heating. When the reaction is complete, the excess acid material can be eliminated by an inert gas purge, e.g. nitrogen sparging. Preferably the carboxylic acid material that is added is kept below its solubility limit in the polymer solution, e.g. below about 1 wt. %, preferably below 0.4 wt. % or less, of free maleic anhydride based on the total weight of polymer-solvent solution, e.g. ethylene copolymer-mineral lubricating oil solution. Continuous or periodic addition of the carboxylic acid material along with an appropriate portion of initiator, during the course of the reaction, can be utilized to maintain the carboxylic acid below its solubility limits, while still obtaining the desired degree of total grafting.

In the initiator grafting step the maleic anhydride or other carboxylic acid material used will be grafted onto both the polymer and the solvent for the reaction. Many solvents such as dichlorobenzene are relatively inert and may be only slightly grafted, while mineral oil will tend to be more grafted. The exact split of graft between the substrate present depends upon the polymer and its reactivity, the reactivity and type of solvent, the concentration of the polymer in the solvent, and also upon the maintenance of the carboxylic acid material in solution during the course of the reaction and minimizing the presence of dispersed, but undissolved acid, e.g. the maleic anhydride. The undissolved acid material appears to have an increased tendency to react to form oil insoluble materials as opposed to dissolved acid material. The split between grafted solvent and grafted polymer may be measured empirically from the infrared analyses of the product dialyzed into a suitable and polymer fractions.

The grafting is preferably carried out in a mineral lubricating oil which need not be removed after the grafting step but can be used as the solvent in the subsequent reaction of the graft polymer with the amine material and as a solvent for the end product to form the lubricating additive concentrate. The oil having attached, grafted carboxyl groups, when reacted with the amine material will also be converted to the corresponding derivatives.

The solution grafting step when carried out in the presence of a high temperature decomposable peroxide can be accomplished without substantial degradation of the chain length (molecular weight) of the ethylene-containing polymer. This can be an advantage as opposed to high temperature thermal reactions which depend on degradation to apparently form free radical reactive sites. Measurement of molecular weights and degradation can be evaluated by determination of the Thickening Efficiency (T.E.) of the polymer as will later be described.

The Amines

The amine component will have two or more primary amine groups, wherein the primary amine groups may be unreacted, or wherein one of the amine groups may already be reacted.

Particularly preferred amine compounds have the following formulas:

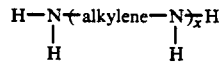

wherein x is an integer of about 1 to 10, preferably about 2 to 7, and the alkylene radical is a straight or branched chain alkylene radical having 2 to 7, preferably about 2 to 4 carbon atoms;

(B) polyoxyalkylene polyamines

where m has a value of about 3 to 70 and preferably 10 to 35; and

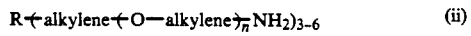

where n has a value of about 1 to 40 with the provision that the sum of all the n's is from about 3 to about 70 and preferably from about 6 to about 35 and R is a polyvalent saturated hydrocarbon radical of up to ten carbon atoms having a valence of 3 to 6. The alkylene groups in either formula (i) or (ii) may be straight or branched chains containing about 2 to 7, and preferably about 2 to 4 carbon atoms. These polyamines generally contain from 2 to 11 nitrogen atoms.

Examples of the alkylene polyamines of formula (A) above include methylene amines, ethylene amines, butylene amines, propylene amines, pentylene amines, hexylene amines, heptylene amines, octylene amines, other polymethylene amines, the cyclic and higher homologs of these amines such as the piperazines, the amino-alkyl-substituted piperazines, etc. These amines include, for example, ethylene diamine, diethylene triamine, triethylene tetramine, propylene diamine, di(-heptamethylene) triamine, tripropylene tetramine, tetraethylene pentamine, trimethylene diamine, pentaethylene hexamine, di(trimethylene) triamine, 2-heptyl-3-(2-aminopropyl) imidazoline, 4-methylimidazoline, 1,3-bis-(2-aminoethyl) imidazoline, pyrimidine, 1(2-aminopropyl) piperazine, 1,4-bis-(2-aminoethyl) piperazine, N,N-dimethylaminopropyl amine, N,N-dioctylethyl amine, N-octyl-N'-methylethylene diamine, 2-methyl-1(2'-aminobutyl) piperazine, etc. Other higher homologs which may be used can be obtained by condensing two or more of the above mentioned alkylene amines in a known manner.

The ethylene amines which are particularly useful are described, for example, in the Encyclopedia of Chemical Technology under the heading of "Ethylene Amines" (Kirk and Othmer), Volume 5, pgs. 898–905; Interscience Publishers, New York (1950). These compounds are prepared by the reaction of an alkylene chloride with ammonia. This results in the production of a complex mixture of alkylene amines, including cyclic condensation products such as piperazines. While mixtures of these amines may be used for purposes of this invention, it is obvious that pure alkylene amines may be used with complete satisfaction.

The polyoxyalkylene polyamines of formula (B) above, preferably polyoxyalkylene diamines and polyoxyalkylene triamines, may have average molecular weights ranging from about 200 to about 4000 and preferably from about 400 to about 2000. The preferred polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

Multifunctionalization (Imidization) Process

The grafted polymer, preferably in solution, can be readily reacted with said poly(primary amine) and mixtures thereof by admixture together and heating at a temperature of from about 100° C. to 250° C. for from 10 minutes to 30 hours, preferably 10 minutes to 10 hours, usually about 15 minutes to about 3 hours. It is preferred to use 0.01 to 2.5 mole, more preferably 0.5 to 1.0 mole, of the poly(primary amine) per mole of grafted carboxylic material such as maleic anhydride. The reaction of diethylene triamine with the grafted ethylene-containing polymer occurs in 15 minutes at a temperature of at least 170° C. with a nitrogen blanket.

The solution grafting step when carried out in the presence of a high temperature decomposable peroxide is accomplished without significant degradation of the chain length (molecular weight) of the ethylene-containing polymer. Measurement of molecular weights and degradation can be evaluated by determination of the thickening efficiency of the polymer.

Thickening efficiency (T.E.) is defined as the ratio of the weight percent of a polyisobutylene (sold as an oil solution by Exxon Chemical Co. as Paratone N), having a Staudinger Molecular Weight of 20,000 required to thicken a solvent-extracted neutral mineral lubricating oil, having a viscosity o 150 SUS at 37.8° C., a viscosity index of 105 and an ASTM pour point of 0° F., (Solvent 150 Neutral) to a viscosity of 12.4 centistokes at 98.9° C., to the weight percent of a test copolymer required to thicken the same oil to the same viscosity at the same temperature. T.E. is related to ($\overline{M}_n$) and is a convenient, useful measurement for formulation of lubricating oils of various grades.

The oil having attached, grafted carboxyl, e.g. maleic anhydride, groups when reacted with the polyfunctional derivatives, e.g. polyamine, is also converted to the corresponding derivatives.

The imidization reaction product contains in the range of 0.001 to 8, preferably 0.01 to 2, wt. % nitrogen and/or oxygen and has a $\overline{M}_n$ in the range of 700 to 500,000 preferably 10,000 to 250,000.

The Dicarboxylic Acid Anhydride Component

In accordance with the instant invention the imidization product is reacted or post-treated with a $C_{12}$ to about $C_{18}$ hydrocarbyl substituted dicarboxylic acid anhydride. The particular type of dicarboxylic acid anhydride component is critical to the present invention and must be a $C_{12}$ to about $C_{18}$, preferably a $C_{12}$ to $C_{18}$, hydrocarbyl dicarboxylic acid anhydride. The anhydride used in the present invention may be represented by the general formula RX wherein R is a hydrocarbyl group containing a total of 12 to about 18, preferably 12 to 16, more preferably 12 to 14, and most preferably 12, carbons, which are essentially aliphatic, saturated or unsaturated, and include alkenyl and alkyl groups, and can be straight chain or branched. When R is an alkenyl group it is preferred that the olefinic unsaturation site be located near the anhydride, i.e., X, moiety. The radical X will usually contain 4 to 10, preferably 4 to 8, more preferably 4 to 6, and most preferably 4, carbon atoms and will define a dicarboxylic acid anhydride. The X radical may be represented by the formula

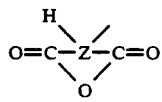

wherein Z is selected from alkylene and alkenylene radicals containing from 2 to 8, preferably 2 to 6, more preferably 2 to 4, and most preferably 2 carbon atoms. Preferably Z is a alkenylene radical. The most preferred X radical is the succinic anhydride radical, i.e.,

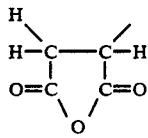

The X radical is linked to the R group by a carbon linkage.

Dicarboxylic acid anhydride materials of the above types and methods for their production are well known. Alkenyl substituted dicarboxylic acid anhydrides can be made by the reaction of the $C_{12}$ to $C_{18}$ alpha-mono-olefin, or chlorinated mono-olefin, with maleic anhydride, e.g., European application 82-302326.2, incorporated herein by reference. Hydrogenation can give the corresponding alkyl derivative.

As mentioned hereinafore it is critical to the present invention that this acid anhydride component be a $C_{12}$ to about $C_{18}$, preferably a $C_{12}$ to $C_{18}$, hydrocarbyl substituted dicarboxylic acid anhydride. If an acid instead of an anhydride is used there will generally be no significant improvement in viscosity stability. Thus, patents or literature disclosing the use of acids themselves with amines are not relevant to the present invention. Furthermore, the use of an acid itself, particularly a monocarboxylic acid, or a monocarboxylic acid anhydride, results in the formation of an acid by-product which is deleterious to the end use of the oleaginous composition containing the V.I. improver-dispersant of the present invention, e.g., causes corrosion.

If the dicarboxylic acid anhydride contains no hydrocarbyl substituent groups, e.g., succinic anhydride, or if it contains a hydrocarbyl substituent group of less than 12 carbon atoms its effectiveness in solubilizing the insoluble grafted oil particles, produced during the free radical grafting in an oil medium of the ethylene copolymer, is adversely affected. Thus, such dicarboxylic acid anhydrides are generally ineffective in reducing the haze of the grafted ethylene copolymer/oil solution. This, in turn, requires an additional haze-treating step described in U.S. Pat. No. 4,137,185. The use of the $C_{12}$ to $C_{18}$ hydrocarbyl substituted dicarboxylic acid anhydrides of the instant invention is effective in solubilizing the grafted oil particles, thereby reducing haze and generally eliminating the need for a haze-treating step.

If, on the other hand, the dicarboxylic acid anhydride is substituted with a hydrocarbyl group containing more than about 18 carbon atoms the low temperature viscosity of the oleaginous composition, e.g., lube oil, begins to be adversely affected. This makes it harder to crank the engine in cold weather to start the engine.

The amount of the hydrocarbyl substituted dicarboxylic acid anhydride component utilized is a viscosity stabilizing effective amount. By viscosity stabilizing effective amount is meant any amount which is effective to stabilize the viscosity of an oleaginous solution of the derivatized ethylene copolymers, i.e., inhibit or retard the increase in viscosity over an extended period of time of an oil solution, particularly an oil concentrate, of the grafted ethylene polymers. Generally this amount is from about 0.5-2.5, preferably 1-1.5 moles of $C_{12}$ to about $C_{18}$ hydrocarbyl substituted dicarboxylic acid anhydride per mole of unreacted primary amino group of the imide grafted ethylene copolymer, i.e., an ethylene copolymer which has been grafted with an ethylenically-unsaturated carboxylic acid material and thereafter reacted with the polyamine containing at least two primary amine groups.

The chain extension termination or end-capping of the grafted ethylene copolymer which was preferentially prepared in a mineral oil solution can be conducted by subsequently injecting the dicarboxylic acid anhydride of the present invention directly into the reaction system used to prepare said grafted ethylene copolymer, or it can be a separate reaction step. In any event, the imide grafted ethylene copolymer is first produced by preparing the graft copolymer of ethylene and ethylenically unsaturated carboxylic acid and then reacting this graft copolymer with at least one polyamine, and this preformed imide grafted copolymer is then subsequently reacted or post-treated with the $C_{12}$ to about $C_{18}$ hydrocarbyl substituted dicarboxylic acid anhydride in a end-capping or chain extension limiting step. A selected amount of the hydrocarbyl substituted dicarboxylic acid anhydride is introduced into the heated solution containing the imide grafted ethylene copolymer and the reaction carried on for a period of about 0.25 to 8 hours at a temperature ranging from about 50° to 250° C., a temperature of about 100° to 200° C. being preferred. In order to fully complete the reaction, it is generally useful to utilize a slight excess, i.e., about 1 to 30, more usually about 1 to 10, percent by weight of the hydrocarbyl substituted dicarboxylic anhydride. The entire reaction is carried out under an inert atmosphere, for example, a nitrogen blanket.

The chain extension limiting or end-capping process step is preferentially conducted on a graft ethylene copolymeric mineral oil solution wherein the excess poly(primary amine), e.g., alkylene polyamine, is reduced to a level of less than about 0.05, optimally less than about 0.02, weight percent free (unreacted) amine.

A minor amount, e.g. 0.01 up to 50 wt %, preferably 0.05 to 25 wt. %, based on the weight of the total composition, of the oil-soluble nitrogen-containing graft ethylene copolymers produced in accordance with this invention can be incorporated into a major amount of an oleaginous material, such as a lubricating oil or hydrocarbon fuel, depending upon whether one is forming finished products or additive concentrates. When used in lubricating oil compositions, e.g. automotive or diesel crankcase lubricating oil, the nitrogen-containing grafted polymer concentrations are usually within the range of about 0.01 to 10 wt %, of the total composition. The lubricating oils to which the products of this invention can be added include not only hydrocarbon oil derived from petroleum, but also include synthetic lubricating oils such as esters of dibasic acids; complex esters made by esterifications of monobasic acids, polyglycols, dibasic acids and alcohols; polyolefin oils, etc.

The nitrogen-containing graft polymers of the invention may be utilized in a concentrate form, e.g., from about 5 wt % up to about 50 wt. %, preferably 7 to 25 wt. %, in oil, e.g., mineral lubricating oil, for ease of handling, and may be prepared in this form by carrying out the reaction of the invention in oil as previously discussed.

The above oil compositions may optionally contain other conventional additives such as pour point depressants, antiwear agents, antioxidants, other viscosity-index improvers, dispersants, corrosion inhibitors, antifoaming agents, detergents, rust inhibitors, friction modifiers, and the like.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 wt. % of a sulfide of phosphorus for ½ to 15 hours, at a temperature in the range of about 66° to about 316° C. Neutralization of the phosphosulfurized hydrocarbon may be effected in the manner taught in U.S. Pat. No. 1,969,324.

Oxidation inhibitors, or antioxidants, reduce the tendency of mineral oils to deteriorate in service which deterioration can be evidenced by the products of oxidation such as sludge and varnish-like deposits on the metal surfaces, and by viscosity growth. Such oxidation inhibitors include alkaline earth metal salts of alkylphenolthioesters having preferably $C_5$ to $C_{12}$ alkyl side chains, e.g., calcium nonylphenol sulfide, barium toctylphenyl sulfide, dioctylphenylamine, phenylalphanaphthylamine, phospho-sulfurized or sulfurized hydrocarbons, etc.

Other oxidation inhibitors or antioxidants useful in this invention comprise oil-soluble copper compounds. The copper may be blended into the oil as any suitable oilsoluble copper compound. By oil soluble it is meant that the compound is oil soluble under normal blending conditions in the oil or additive package. The copper compound may be in the cuprous or cupric form. The copper may be in the form of the copper dihydrocarbyl thio- or dithio-phosphates. Alternatively, the copper may be added as the copper salt of a synthetic or natural carboxylic acid. Examples of same thus include $C_{10}$ to $C_{18}$ fatty acids, such as stearic or palmitic acid, but unsaturated acids such as oleic or branched carboxylic acids such as napthenic acids of molecular weights of from about 200 to 500, or synthetic carboxylic acids, are preferred, because of the improved handling and solubility properties of the resulting copper carboxylates. Also useful are oil-soluble copper dithiocarbamates of the general formula $(RR,NCSS)nCu$ (where n is 1 or 2 and R and R, are the same or different hydrocarbyl radicals containing from 1 to 18, and preferably 2 to 12, carbon atoms, and including radicals such as alkyl, alkenyl, aryl, aralkyl, alkaryl and cycloaliphatic radicals. Particularly preferred as R and R, groups are alkyl groups of from 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenol, butylphenyl, cyclohexyl, methylcyclopentyl, propenyl, butenyl, etc. In order to obtain oil solubility, the total number of carbon atoms (i.e., R and R,) will generally be about 5 or greater. Copper sulphonates, phenates, and acetylacetonates may also be used.

Exemplary of useful copper compounds are copper CuI and/or CuII salts of alkenyl succinic acids or anhydrides. The salts themselves may be basic, neutral or acidic. They may be formed by reacting (a) polyalkylene succinimides (having polymer groups of $M_n$ of 700 to 5,000) derived from polyalkylene-polyamines, which have at least one free carboxylic acid group, with (b) a reactive metal compound. Suitable rective metal compounds include those such as cupric or cuprous hydroxides, oxides, acetates, borates, and carbonates or basic copper carbonate.

Examples of these metal salts are Cu salts of polyisobutenyl succinic anhydride, and Cu salts of polyisobutenyl succinic acid. Preferably, the selected metal employed is its divalent form, e.g., Cu+2. The preferred substrates are polyalkenyl succinic acids in which the alkenyl group has a molecular weight greater than about 700. The alkenyl group desirably has a $M_n$ from about 900 to 1,400, and up to 2,500, with a $M_n$ of about 950 being most preferred. Especially preferred is polyisobutylene succinic anhydride or acid. These materials may desirably be dissolved in a solvent, such as a mineral oil, and heated in the presence of a water solution (or slurry) of the metal bearing material. Heating may take place between 70° and about 200° C. Temperatures of 110° C. to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-polyisobutenyl succinic anhydride, Cu-oleate, or mixtures thereof) will be generally employed in an amount of from about 50 to 500 ppm by weight of the metal, in the final lubricating or fuel composition.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutyenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydrocarbyl succinimide, S-carboxyalkylene hydrocarbyl succinamic acid and mixtures thereof; U.S. Pat. No. 3,879,306 which discloses N(hydroxyalkyl) alkenyl-succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are succinate esters, or metal salts thereof, of hydrocarbyl substituted succinic acids or anhydrides and thiobisalkanols such as described in U.S. Pat. No. 4,344,853.

Dispersants maintain oil insolubles, resulting from oxidation during use, in suspension in the fluid thus preventing sludge flocculation and precipitation or deposition on metal parts. Suitable dispersants include high molecular weight alkyl succinimides, the reaction product of oil-soluble polyisobutylene succinic anhydride with ethylene amines such as tetraethylene pentamine and borated salts thereof.

Pour point depressants, otherwise known as lube oil flow improvers, lower the temperature at which the fluid will flow or can be poured. Such additives are well known. Typically of those additives which usefully optimize the low temperature fluidity of the fluid are $C_8$–$C_{18}$ dialkylfumarate vinyl acetate copolymers, polymethacrylates, and wax naphthalene. Foam control can be provided by an antifoamant of the polysiloxane type, e.g., silicone oil and polydimethyl siloxane.

Anti-wear agents, as their name implies, reduce wear of metal parts. Representatives of conventional antiwear agents are zinc dialkyldithiophosphate and zinc diaryldithiosphate.

Detergents and metal rust inhibitors include the metal salts of sulphonic acids, alkyl phenols, sulfurized alkyl phenols, alkyl salicylates, naphthenates and other oil soluble mono- and di-carboxylic acids. Highly basic (viz, overbased) metal sales, such as highly basic alkaline earth metal sulfonates (especially Ca and Mg salts) are frequently used as detergents. Representative examples of such materials, and their methods of preparation, are found in co-pending Ser. No. 754,001, filed Jul. 11, 1985, the disclosure of which is hereby incorporated by reference.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts which are effective to provide their normal attendant function. Representative effective amounts of such additives are illustrated as follows:

| Additive | Wt. % a.i. (Broad) | Wt. % a.i. (Preferred) |
|---|---|---|
| Viscosity Modifier | .01–12 | .01–4 |
| Corrosion Inhibitor | 0.01–5 | .01–1.5 |
| Oxidation Inhibitor | 0.01–5 | .01–1.5 |
| Dispersant | 0.1–20 | 0.1–8 |
| Pour Point Depressant | 0.01–5 | .01–1.5 |
| Anti-Foaming Agents | 0.001–3 | .001–0.15 |
| Anti-Wear Agents | 0.001–5 | .001–1.5 |
| Friction Modifiers | 0.01–5 | .01–1.5 |
| Detergents/Rust Inhibitors | .01–10 | .01–3 |
| Mineral Oil Base | Balance | Balance |

When other additives are employed, it may be desirable, although not necessary, to prepare additive concentrates comprising concentrated solutions or dispersions of the dispersant (in concentrate amounts hereinabove described), together with one or more of said other additives (said concentrate when constituting an additive mixture being referred to herein as an additive package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the dispersant additive and optional additional additives in proper amounts to provide the desired concentration in the final formulation when the additive-package is combined with a predetermined amount of base lubricant. Thus, the products of the present invention can be added to small amounts of base oil or other compatible solvents along with other desirable additives to form additive-packages containing active ingredients in collective amounts of typically from about 2.5 to about 90%, and preferably from about 5 to about 75%, and most preferably from about 8 to about 50% by weight additives in the appropriate proportions with the remainder being base oil.

The final formulations may employ typically about 10 wt. % of the additive-package with the remainder being base oil.

All of said weight percents expressed herein are based on active ingredient (a.i.) content of the additive, and/or upon the total weight of any additive-package, or formulation which will be the sum of the a.i. weight of each additive plus the weight of total oil or diluent.

As mentioned hereinafore, the $C_{12}$ to about $C_{18}$ hydrocarbyl substituted dicarboxylic acid anhydride endcapped imide grafted ethylene copolymers of the present invention are particularly useful as fuel and lubricating oil additives.

The end-capped imide grafted ethylene copolymers of this invention find their primary utility, however, in lubricating oil compositions, which employ a base oil in which these copolymers are dissolved or dispersed.

Thus, base oils suitable for use in preparing the lubricating compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Thus, the additives of the present invention may be suitably incorporated into synthetic base oils such as alkyl esters of dicarboxylic acids, polyglycols and alcohols; polyalpha-olefins, polybutenes, alkyl benzenes, organic esters of phosphoric acids, polysilicone oils, etc.

Natural base oils include mineral lubricating oils which may vary widely as to their crude source, e.g., whether paraffinic, naphthenic, mixed, paraffinicnaphthenic and the like; as well as to their formation, e.g., distillation range, straight run or cracked, hydrofined, solvent extracted and the like.

More specifically, the natural lubricating oil base stocks which can be used in the compositions of this invention may be straight mineral lubricating oil or distillates derived from paraffinic, naphthenic, asphaltic, or mixed base crudes, or, if desired, various blends oils may be employed as well as residuals, particularly those from which asphaltic constituents have been removed. The oils may be refinded by conventional methods using acid, alkali, and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, etc.

The lubricating oil base stock conveniently has a viscosity of typically about 2.5 to about 12, and preferably about 2.5 to about 9 cSt. at 100° C.

Thus, the additives of the present invention can be employed in a lubricating oil composition which comprises lubricating oil, typically in a major amount, and the additive, typically in a minor amount, which is effective to impart enhanced dispersancy and/or V.I. improvement relative to the absence of the additive.

The imide grafted ethylene copolymers endcapped with the $C_{12}$ to about $C_{18}$ hydrocarbyl substituted idcarboxylic acid anhydrides, preferably succinic anhydride, are oil-soluble, dissolvable in oil with the aid of a suitable solvent, or are stably dispersible materials. Oil-soluble, dissolvable, or stably dispersible as that terminology is used herein does not necessarily indicate that the materials are soluble, dissolvable, miscible, or capable of being suspended in oil in all proportions. It does mean, however, that the additives, for instance, are soluble or stably dispersible in oil to an extent sufficient to exert their intended effect in the environment in which the oil is employed. Moreover, the additional incorporation of other additives may also permit incorporation of higher levels of a particular copolymer hereof, if desired.

Accordingly, while any effective amount, i.e., dispersant or viscosity index improving-dispersant effective amount, of the additives of the present invention can be incorporated into the fully formulated lubricating oil composition, it is contemplated that such effective amount be sufficient to provide said lube oil composition with an amount of the additive of typically from about 0.01 to about 10, preferably 0.1 to 6.0, and more preferably from 0.25 to 3.0 wt %, based on the weight of said composition.

The following examples, which include preferred embodiments and wherein all parts are by weight unless otherwise indicated, further illustrate the present invention.

The following three examples illustrate compositions falling outside the scope of the instant invention and are presented for comparative purposes only.

EXAMPLE 1

This Example illustrates an oleaginous composition containing a non-endcapped imide grafted ethylene-propylene copolymer.

Into a reactor vessel are charged about 37,308 kilograms of a 20 wt. % oil solution (Solvent 130 Neutral low pour mineral lubricating oil) of ethylene-propylene copolymer containing about 45 wt. % propylene having a T.E. of 1.2 ($\overline{M}_n$ of about $20 \times 10^3$, $\overline{M}_w$ of about $27 \times 10^3$), followed by heating to about 154° C. under nitrogen sparge and with stirring for several hours. Then 194 kilograms of maleic anhydride, and 40 kilograms of di-t-butylperoxide as a free radical initiator in three equal charges over a total period of 1.5 hours are added. Heating at 154° C. under a nitrogen blanket are maintained for a period of one hour. The unreacted maleic anhydride and any byproducts formed are sparged off with nitrogen for 0.5 hour. While maintaining the nitrogen blanket 140 kilograms (0.38 wt. %, 1359 moles) of diethylene triamine are charged into the reactor over a period of 25 seconds, and the reaction mixture is heated at 154° C. for 0.5 hour. The reaction byproducts are sparged off with nitrogen for a period of 4 hours.

The following properties of the resultant oil solution of imide grafted ethylene-propylene copolymer are determined:

The initial K.V., kinematic viscosity, at 100° C. in terms of Centistokes;

The K.V. at 100° C. in terms of Centistokes after storage at 80° C. for 8 weeks; and The haze, in nephelos, measured in a nephelometer haze meter, namely Nepho-colorimeter Model 9 sold by Coleman Instrument Corporation of Maywood, Ill. In this test, 0 indicates no haze, while at about a 75 reading haze begins to become visible to the naked eye. The results are set forth in Table I.

EXAMPLE 2

This Example illustrates the end-capping of an imide grafted ethylene-propylene copolymer with acetic anhydride.

A reactor vessel containing 724 grams of reaction product oil solution prepared substantially in accordance with the procedure of Example 1 (the imide grafted ethylene-propylene copolymer containing 0.0165 mole unreacted primary amine) is heated to 154° C. under a nitrogen blanket. To this heated solution are added, while stirring, 3.53 grams (0.5 wt %, 0.034 moles) of acetic anhydride over a period of 5 minutes. Heating, under a nitrogen blanket, is continued at 154° C. for a period of 15 minutes. The acetic acid by-product and any unreacted acetic anhydride are sparged off with nitrogen. The product is then diluted with S130N mineral oil. The initial viscosity at 100° C., viscosity after storage at 80° C. for 8 weeks, and haze of this acetic anhydride end-capped imide grafted ethylene-propylene copolymer oil solution are determined as in Example 1, and the results are set forth in Table I.

EXAMPLE 3

This Example illustrates the end-capping of an imide grafted ethylene-propylene copolymer with n-octenyl succinic anhydride.

A reactor vessel containing 716 grams of a reaction product oil solution prepared substantially in accordance with the procedure of Example 1 (the imide grafted ethylene-propylene copolymer containing 0.0163 mole unreacted primary amine) is heated to 154° C. under nitrogen sparge. To this heated solution are added, under a nitrogen blanket with stirring, 7.37 grams (1.03 wt. %, 0.034 mole) of n-octenyl succinic anhydride over a period of 5 minutes. Heating, under a nitrogen blanket, is continued at 154° C. for 0.5 hour. The haze of this n-octenyl succinic anhydride end-capped imide grafted ethylene-propylene copolymer oil solution is determined as in Example 1, and the result is set forth in Table 1.

The following Examples illustrate compositions of the present invention.

EXAMPLE 4

This Example illustrates the end-capping of an imide grafted ethylene-propylene copolymer with dodecenyl succinic anhydride.

A reactor vessel containing 719 grams of a reaction product oil solution prepared substantially in accordance with the procedure of Example 1 (the imide grafted ethylene-propylene copolymer containing 0.0164 mole unreacted primary amine) is heated to 154° C. under nitrogen sparge. To this heated solution are added, under a nitrogen blanket with stirring, 9.35 grams (1.3 wt. %, 0.035 mole) of dodecenyl succinic anhydride over a period of 5 minutes. Heating, under a nitrogen blanket, is continued at 154° C. for a period of 0.5 hour. This oil solution of the reaction product is then diluted with a S130N mineral oil.

The initial viscosity at 100° C., viscosity after storage at 80° C. for 8 weeks, and haze of this dodecenyl succinic anhydride end-capped imide grafted ethylene-propylene copolymer oil solution are determined as in Example 1, and the results are set forth in Table I.

EXAMPLE 5

This Example also illustrates the end-capping of an imide grafted ethylene-propylene copolymer with dodecenyl succinic anhydride.

A reactor vessel containing 702 grams of a reaction product oil solution prepared substantially in accordance with the procedure of Example 1 (the imide grafted ethylene-propylene copolymer containing 0.0163 mole unreacted primary amine) is heated to 154° C. under a nitrogen sparge. To this heated solution are added, under a nitrogen blanket with stirring, 4.43 grams (0.65 wt. %, 0.0167 mole) of dodecenyl succinic anhydride over a period of 5 minutes. Heating, under a nitrogen blanket, is continued at 154° C. for a period of 0.5 hour. This oil solution of the reaction product is then diluted with S130N mineral oil.

The initial viscosity at 100° C., viscosity after storage at 80° C. for 8 weeks, and haze of this dodecenyl succinic anhydride end-capped imide grafted ethylene-propylene copolymer oil solution are determined as in Example 1, and the results are set forth in Table I.

TABLE I

| Example No. | Initial Viscosity (Centistokes) | Viscosity (Centistokes) after storage at 80° C. for 8 weeks | Viscosity (Centistokes) | Viscosity Increase %/hour | Haze |
| --- | --- | --- | --- | --- | --- |
| 1 | 852 | 1161 | +309 | +0.027 | 36 |
| 2 | 885 | 922 | +37 | +0.0028 | 28 |
| 3 | — | — | — | — | 34 |
| 4 | 786 | 779 | −7 | −0.001 | 26 |
| 5 | 844 | 871 | +27 | +0.0027 | 26 |

As illustrated by the data in Table I the compositions of the instant invention (Examples 4–5) exhibit both reduced viscosity increase over time, i.e., better storage stability, and reduced haze compared to non-endcapped imide grafted ethylene-propylene copolymer of Example 1, and the acetic anhydride end-capped copolymer of Example 2. The instant compositions also exhibit reduced haze compared to the n-octenyl succinic anhydride endcapped imide grafted ethylene-propylene copolymer of Example 3.

I claim:

1. An oil soluble additive consisting essentially of reaction product of:
   (i) preformed reactive nitrogen containing grafted ethylene copolymer consisting essentially of reaction product of
      (a) oil soluble grafted ethylene copolymer comprising from about 15 to 90 wt. % ethylene and about 10 to 85 wt. % of at least one $C_3$ to $C_{28}$ alpha-olefin, having a number average molecular weight of from about 700 to about 500,000, and grafted with ethylenically unsaturated carboxylic acid material having 1 to 2 carboxylic acid groups or anhydride group, and
      (b) at least one polyamine having at least two primary amine groups, and
   (ii) an amount effective to retard viscosity increase over time of a lubricating oil composition containing said additive, of at least one $C_{12}$ to $C_{16}$ aliphatic hydrocarbyl substituted succinic anhydride, wherein from about 0.5 to about 1.0 moles of said polyamine (b) per mole of said grafted ethylene copolymer component (a) have been reacted at a temperature of from about 100° to about 250° C. prior to the reaction of said preformed reactive nitrogen containing ethylene copolymer reactant (i) with said aliphatic hydrocarbyl substituted succinic anhydride (ii).

2. The composition according to claim 1 wherein said (a) comprises a copolymer consisting essentially of about 30 to 80 wt. % ethylene and about 20 to about 70 wt. % propylene, having a number average molecular weight in the range of about 10,000 to 250,000, grated with maleic anhydride.

3. The composition according to claim 1 wherein said polyamine (b) is selected from the group consisting of poly(alkylene amines) having alkylene groups of about 2 to 7 carbon atoms and 2 to 11 nitrogens, and poly(oxyalkylene amines) wherein the alkylene groups contain 2 to 7 carbon atoms and the number of oxyalkylene groups is about 3 to 70.

4. The composition of claim 1 wherein from about 0.5 to about 2.5 moles of said $C_{12}$ to $C_{16}$ aliphatic hydrocarbyl substituted succinic anhydride is added per mole of unreacted primary amine group in said preformed reactive nitrogen group containing grafted copolymer reaction product.

5. The composition of claim 4 wherein from about 1 to 1.5 moles of said aliphatic hydrocarbyl substituted succinic anhydride is added per mole of unreacted primary amine group in said performed reactive nitrogen group containing grafted copolymer reaction product.

6. The composition of claim 1 wherein said aliphatic hydrocarbyl group of (ii) contains from 12 to 14 carbon atoms.

7. The composition of claim 6 wherein said aliphatic hydrocarbyl group of (ii) contains 12 carbon atoms.

8. A lubricating oil composition comprising lubricating oil and from about 0.01 to 50 wt. % of the oil soluble additive of claim 1.

9. A lubricating oil composition according to claim 8 which contains from about 0.01 to 10 wt. % of said oil soluble additive.

10. A lubricating oil composition according to claim 8 which is an additive concentrate comprising lubricating oil and about 5 to 50 wt. % of said oil soluble additive.

11. A process for improving the viscosity stability of a lubricating oil composition containing lubricating oil and an oil soluble reactive nitrogen containing grafted ethylene copolymer oil additive which is the reaction product of:
(a) oil soluble grafted ethylene copolymer comprising from about 15 to 90 wt. % ethylene and about 10 to 85% of one or more $C_3$ to $C_{28}$ alpha-olefins, having a number average molecular weight of from about 700 to 500,000, and grafted with ethylenically unsaturated carboxylic acid material having 1 to 2 carboxylic acid groups or anhydride group, and
(b) at least one polyamine having at least two primary amine groups, wherein from about 0.5 to about 1.0 moles of polyamine (b) are reacted per mole of grafted ethylene copolymer (a) at a temperature of from about 100° to about 250° C., which comprises post-reacting said reaction product of (a) and (b) with a viscosity stability improving effective amount of at least one $C_{12}$ to $C_{16}$ aliphatic hydrocarbyl substituted succinic anhydride.

12. The process of claim 11 wherein from about 0.5 to about 2.5 moles of said $C_{12}$ to $C_{16}$ aliphatic hydrocarbyl substituted succinic anhydride per mole of unreacted primary amine group in said reaction product of (a) and (b) is used in said post-reacting step.

13. The process of claim 12 wherein from about 1 to about 1.5 moles of said hydrocarbyl substituted succinic anhydride per mole of unreacted primary amine group in said reaction product of (a) and (b) is used in said post-reacting step.

14. The process of claim 11 wherein said aliphatic hydrocarbyl substituted succinic anhydride is a $C_{12}$ to $C_{14}$ aliphatic hydrocarbyl substituted succinic anhydride.

15. The process of claim 14 wherein said aliphatic hydrocarbyl substituted succinic anhydride is a $C_{12}$ aliphatic hydrocarbyl substituted succinic anhydride.

16. The process of claim 11 wherein the amount of said $C_{12}$ to $C_{16}$ aliphatic hydrocarbyl substituted succinic anhydride used in said post-reaction is an excess of at least 5% based on the unreacted residual primary amine concentration in said reaction product of (a) and (b).

17. The process of claim 11 wherein said post-reaction is conducted at a temperature of about 50° to 250° C. for a period of time from about 0.25 to 8 hours.

18. An oil soluble reactive nitrogen containing grafted ethylene copolymer useful as a lubricating oil additive prepared by a process comprising:
(i) preforming a reaction product of
(a) oil soluble ethylene copolymer comprising from about 15 to 90 wt. % ethylene and about 10 to 85 wt. % of at least one $C_3$ to $C_{28}$ alpha-olefin, having a number average molecular weight of from about 700 to 500,000, and grafted with ethylenically unsaturated carboxylic acid material having 1 to 2 carboxylic acid groups or anhydride group, and
(b) from about 0.5 to about 1.0 moles per mole of said copolymer (a) of at least one polyamine having at least two primary amine groups, said preformed reaction product being prepared at a temperature of from about 100° to about 250° C.; and
(ii) subsequently post-reacting the reactive nitrogen present within said preformed reaction product (i) with an amount of at least one $C_{12}$ to $C_{16}$ aliphatic hydrocarbyl substituted succinic anhydride post-reactant effective to improve the viscosity stability over time of a lubricating oil composition containing the resulting post-reacted product.

19. The copolymer of claim 18 wherein from about 0.5 to about 2.5 moles of said aliphatic hydrocarbyl substituted succinic anhydride per mole of unreacted primary amine group in said preformed reaction product (i) is used during the post-reacting of (i).

20. The copolymer of claim 19 wherein from about 1 to about 1.5 moles of said aliphatic hydrocarbyl substituted succinic anhydride per mole of unreacted primary amine group in said preformed reaction product (i) is used during the post-reacting of (i).

21. The copolymer of claim 18 wherein the aliphatic hydrocarbyl group of said hydrocarbyl substituted succinic anhydride post-reactant is $C_{12}$ to $C_{14}$ aliphatic hydrocarbyl.

22. The copolymer of claim 21 wherein said aliphatic hydrocarbyl group of said post-reactant is $C_{12}$ aliphatic hydrocarbyl.

* * * * *